United States Patent [19]

Gurs

[11] Patent Number: 4,835,784
[45] Date of Patent: May 30, 1989

[54] GAS TRANSPORT LASER

[75] Inventor: Karl Gurs, Eschborn, Fed. Rep. of Germany

[73] Assignee: Rheinmetall GmbH, Düsseldorf, Fed. Rep. of Germany

[21] Appl. No.: 135,372

[22] Filed: Dec. 21, 1987

[30] Foreign Application Priority Data

Dec. 20, 1986 [DE] Fed. Rep. of Germany ....... 3643735

[51] Int. Cl.⁴ .............................................. H01S 3/22
[52] U.S. Cl. ......................................... 372/58; 372/92
[58] Field of Search ......................... 372/58, 59, 55, 92

[56] References Cited

U.S. PATENT DOCUMENTS

| 4,242,646 | 12/1980 | Macken | 372/58 |
| 4,573,162 | 2/1986 | Bakowsky et al. | 372/58 |
| 4,612,646 | 9/1986 | Zerr | 372/58 |
| 4,624,004 | 11/1986 | Gürs | 372/58 |
| 4,672,622 | 6/1987 | Gürs et al. | 372/58 |

FOREIGN PATENT DOCUMENTS 0136983 9/1984 Japan ..................................... 378/58

Primary Examiner—Léon Scott, Jr.
Attorney, Agent, or Firm—Spencer & Frank

[57] ABSTRACT

A gas transport laser with longitudinal gas flow and complete integration of the components, having at least one laser tube, wherein the laser gas is drawn off in the center of the respective laser tube, fed through a radial blower, a cooling system and a gas supply system and then supplied to the respective two ends of the laser tube. The laser tube is disposed in general perpendicularly to the direction of the gas flow in the cooling system and the gas supply system extends in the direction of the lesser dimension of the laser system, so as to optimize the use of space. The laser gas is subjected simultaneously to a high frequency and a high voltage discharge to achieve a high degree of efficiency.

16 Claims, 5 Drawing Sheets

GAS TRANSPORT LASER

BACKGROUND OF THE INVENTION

The invention relates to a gas transport laser with longitudinal gas flow and complete integration of the components with at least one laser tube, where the laser gas is drawn off in the center of the respective laser tube, fed through a radial blower, a cooling system and a gas supply system and then supplied to the respective two ends of the laser tube, and where the laser tube is disposed on, and so as to extend perpendicularly to, the axis of the radial blower.

The efficiency of molecular lasers and in particular $CO_2$-lasers decreases with increased termperature in the laser gas. Among the reasons for this are the width of the fluorescence lines increasing with increasing temperature, the excitation energy being distributed to an increasing number of rotational levels, the amount of deactivating collisions increasing, the occupation of the end level of the laser because of thermal excitation increasing and thus the inversion decreasing (see K. Gürs, "Laser 75 Opto-Electronics", München 1975, Conference Proceedings, pp. 30 to 37).

For this reason, a number of methods for keeping the temperature of a laser gas low have been developed. In connection with a particularly advantageous method the heat is bled off with the laser gas (in a gas transport laser). Lasers operating according to this method comprise an excitation zone with an adjacent or integrated optical resonator, from which gas is fed across coolers, and a pump.

Gas transport lasers are divided into those with longitudinal and those with transverse gas flow. In transverse systems the time spent by the excited active molecules in the laser resonator is comparitively short and in general shorter than their life. This results in an increase of the so-called saturation power. It can become greater than the actual power density in the laser resonator. This results in the excitation energy being bled off to a large degree together with the laser gas, thus not being transformed into laser output. Therefore gas transport lasers with transverse flow have a comparatively small efficiency which in general is less than 10%. Furthermore, excitation in transverse lasers is relatively inhomogeneous, which leads to adverse beam characteristics.

For this reason interest has in general increasingly been transferred to lasers with longitudinal gas flow. However, with these, too, correspondingly large amounts of heat must be bled off and large amounts of gas must be recirculated. Separate pumps and coolers, which are connected by tubing, are utilized with the known gas transport lasers with longitudinal gas flow. Therefore, the known lasers of this type are large and expensive. Their range of use is limited because of their bulkiness. Furthermore, the tubing causes a corresponding flow resistance. Because of this the efficiency of the systems is decreased, or particularly large pumps are required.

It has already been possible to overcome these disadvantages of the known gas transport lasers by a device in which the laser chamber is designed as a cooled pipe and disposed concentricaly within a circulating turbine (see German Published Patent Application DE-OS 31 21 372). However, this laser can only be realized with large structural expense (also see German Published Patent Application DE-OS 32 45 959). Moreover, these known lasers have the following disadvantages:

1. When applying high voltage to the electrode ring there is the possibility that there will not only be a gas discharge in the laser tube in the direction of flow, but also a breakdown in the opposite direction towards the housing or cooler. To avoid this, the electrode ring must be disposed far inside the laser tube and a long dead section (section free of excitation) must be tolerated.

2. Tubes of diameters greater than 25 mm must be used in connection with efficient longitudinal gas transport lasers, in which it is difficult to generate a uniform high voltage glow discharge. Some suggestions for improving homogeneity are known: According to Herziger et al (German Patent DE-PS 33 23 954) swirling with tangential feeding of the laser gas improves the uniformity of discharge. J.E. Harry and S. SN Saleh use segmented electrodes (Appl. Phys. Lett. 40, 1982, 359–361). In H. Sugawara et al the suggestion is found to shape the electrode ring support in a particular way (Rev. of Laser Eng. 9, Japan, 1981, pp. 21 to 30). These suggestions result in improvements but do not represent ideal solutions. A uniform discharge could be achieved with high-frequency excitation; however, the expense for this type of excitation, particularly with large laser output, appears to be unjustifiably large.

3. In the laser according to German DE 32 45 959 A1 a combination of several lasers without the use of additional mirrors (deflection mirrors) is only possible if these lasers are combined in a longitudinal direction. This results in very long unwieldy systems.

SUMMARY OF THE INVENTION

It is therefore an object of the present invention to improve a laser of the previously discussed type in such a way that it can be constructed simply, cost-effectively and with optimal use of space while still having a high degree of efficiency.

This object is attained in accordance with the invention by providing a gas transport laser in which the laser tube with the laser resonator is in general disposed perpendicularly to the direction of flow in the cooling system and the gas supply system and extend in the direction of the lesser dimension of the laser system, and for the excitation of the laser gas it is simultaneously subjected to a high frequency and a high voltage discharge.

The laser in accordance with the invention has the particular advantage over the known laser devices, that the size and weight of the laser is reduced and the emission characteristics and degree of efficiency are improved. Furthermore, the invention offers the advantage of modular construction, so that with optimal use of space the output power can easily be adapted to the requirements by the combination of a plurality of modules.

Finally, the invention additionally solves a basic physical problem:

This is based on the fact that the ionization energy of the laser molecules is considerably greater (13.7 eV for $CO_2$ and 15.5 eV for $N_2$) than the electron energy for the optimal excitation of the upper laser level (1 to 2 eV). Therefore, to maintain self sustained gas discharge, electron energies are required with which only a very ineffective excitation is possible, which results in a low efficiency. To increase the efficiency it is necessary to separate the processes of electron generation and acceleration of the electrons required for excitation from each other. According to the invention, this is successful by virtue of the hybrid excitation method (subjecting the laser gas in part of the volume to high frequency and over the whole tube for high voltage discharge).

BRIEF DESCRIPTION OF THE DRAWINGS

Further details and advantages of the invention reside in the exemplary embodiments described below with reference to the drawings in which.

DESCRIPTION OF THE PREFERRED EMBODIMENTS

Figure 1:
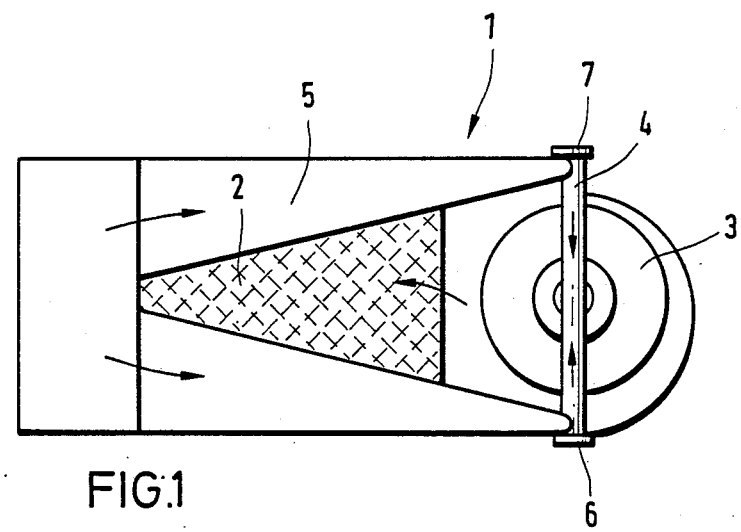
FIG. 1 is a top plan view of the gas circulating system of a laser device according to the invention.

In FIG. 1, a gas transport laser, in general comprising a cooling system 2, a radial blower 3, a laser tube 4 and a gas supply system 5, is designated with the reference numeral 1.

The mirrors disposed at the ends of the laser tube 4 are designated as 6 and 7 and comprise the laser resonator.

Figure 2:
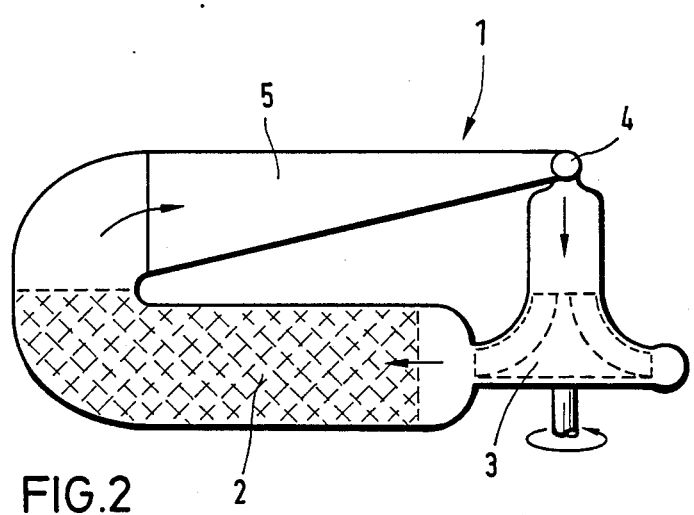
FIG. 2 is a lateral view of the gas circulating system in accordance with FIG. 1.

FIG. 2 is a lateral view of the gas supply system in accordance with FIG. 1. Identical reference numerals have been applied to identical modules.

The mode of operation of the gas transport laser in accordance with FIGS. 1 and 2 is briefly addressed below. The laser gas is drawn off by the radial blower 3 without an intermediate pipeline from the center outlet of the laser tube 4. The laser tube has been fashioned in a known manner of an electrically insulating material (e.g. glass, quartz or ceramic material). The gas then flows directly or via a diffuser but without use of a pipeline into the cooling system 2, from where it is rerouted into the gas supply system (gas feed) 5, made of an electrically insulating material. The laser gas is again returned into the laser tube 4 at each of two ends.

Figure 4:
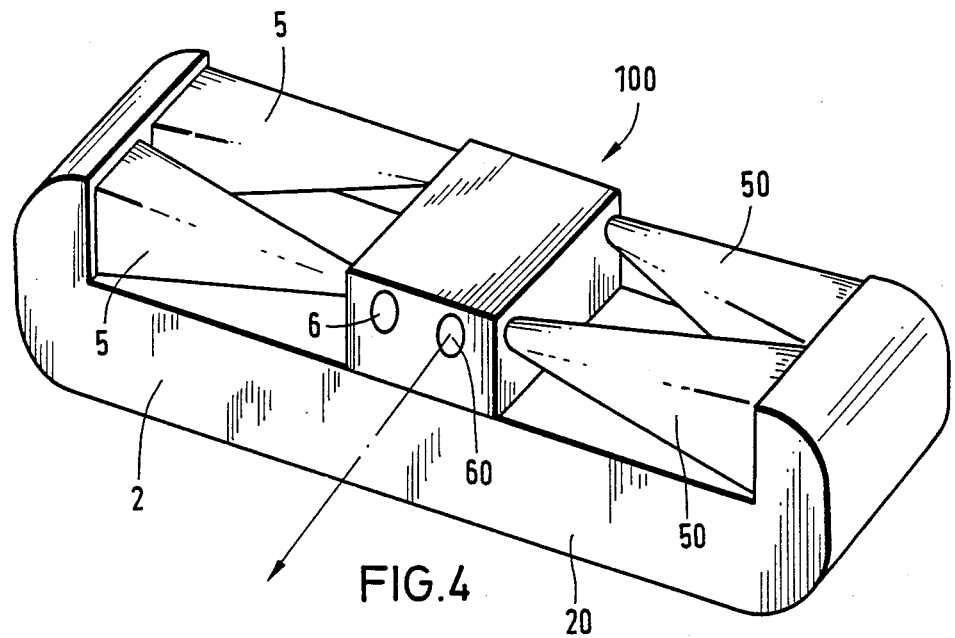
FIG. 4 is a perspective view of the laser module illustrated in FIG. 3.

In this way the direction of flow in the cooling system 2 and the gas supply system 5 is perpendicular to the direction of flow in the laser tube 4, and both directions are perpendicular to the axis of the radial blower 3. The optimal length of the active laser section is the result of two requirements: it must, at the same time, be of sufficient length to obtain sufficient interaction of the molecules with the radiation field and as short as possible to obtain a compact construction, and the length of the dead sections must be minimized. As a whole a total length of the laser tube 4 of from 55 to 65 cm at a gas velocity of 150 to 250 m/s has been found to be particularly advantageous. This dimension of the laser is less than the dimension of the laser in the direction of gas flow in the cooling system 2 and gas supply system (gas feed) 5, and thus the laser tube 4 extends in the direction of least horizontal dimension of the laser. Typical dimensions of the laser according to FIG. 4 are 160 cm in length (direction of the cooling systems), 60 cm along the laser tubes and 50 cm in the the third direction, here the vertical direction. Several laser modules are combined along the direction of the laser tubes (horizontal direction).

Figure 3:
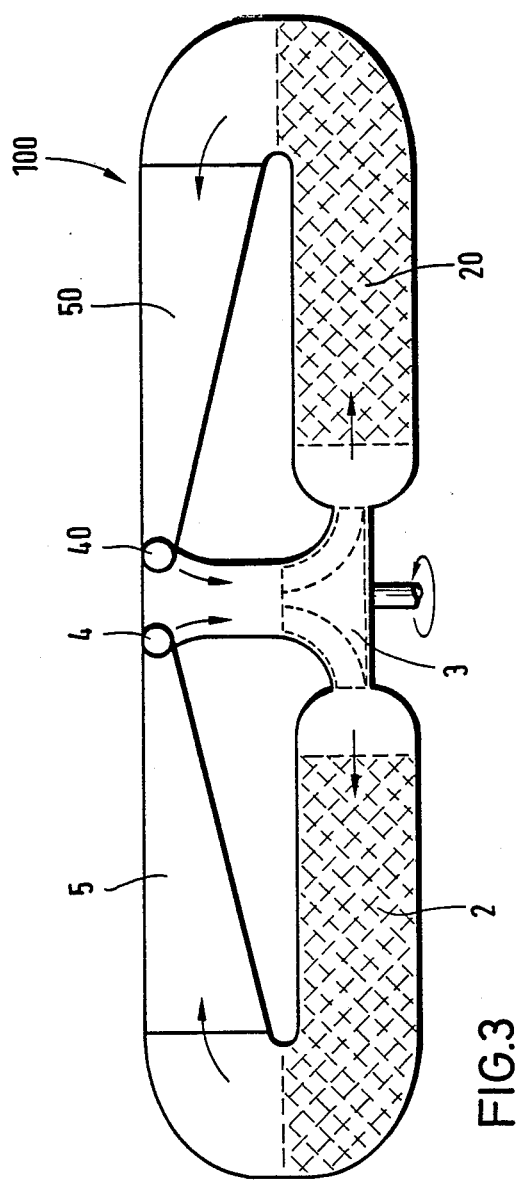
FIG. 3 is a lateral view of a further exemplary embodiment with two laser resonators.

A further exemplary embodiment of the invention is shown in FIGS. 3 and 4, in which there are two laser tubes arranged parallel to each other. The laser gas flows, on the one hand, via the cooling system 2 and the gas supply system 5 to the laser tube 4. On the other hand, the gas is also supplied to the laser tube 40 via a cooling system designated as 20 and a gas supply system (gas feed) designated as 50. As in the first exemplary embodiment, again all three directions (direction of flow in the cooling system and gas supply system, the direction of the laser resonator axis and the direction of the axis of the radial blower) are oriented perpendicularly to each other in pairs. In this exemplary embodiment and with tube diameters of 3 cm the laser according to the invention has an initial output of approximately 1.5 to 2.5 kW.

Figure 8:
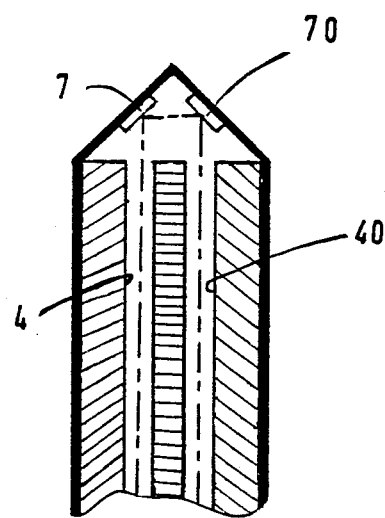
FIG. 8 is a schematic illustration of the deflection of a laser beam from one laser tube to another in the laser module of FIG. 4.

In FIG. 4, the laser module with the gas supply system according to FIG. 3 is perspectively shown in a total view as seen from the outside. At the front end of the respective laser tubes 4 and 40 are disposed a fully reflecting laser mirror 6 and a transmissive mirror 60. As shown in FIG. 8, on the back ends of the laser tubes 4 and 40 are disposed two mirrors 7 and 70 inclined at opposite angles of 45°, by means of which the laser beam is redirected from one resonator into the other at the back ends.

Figure 5:
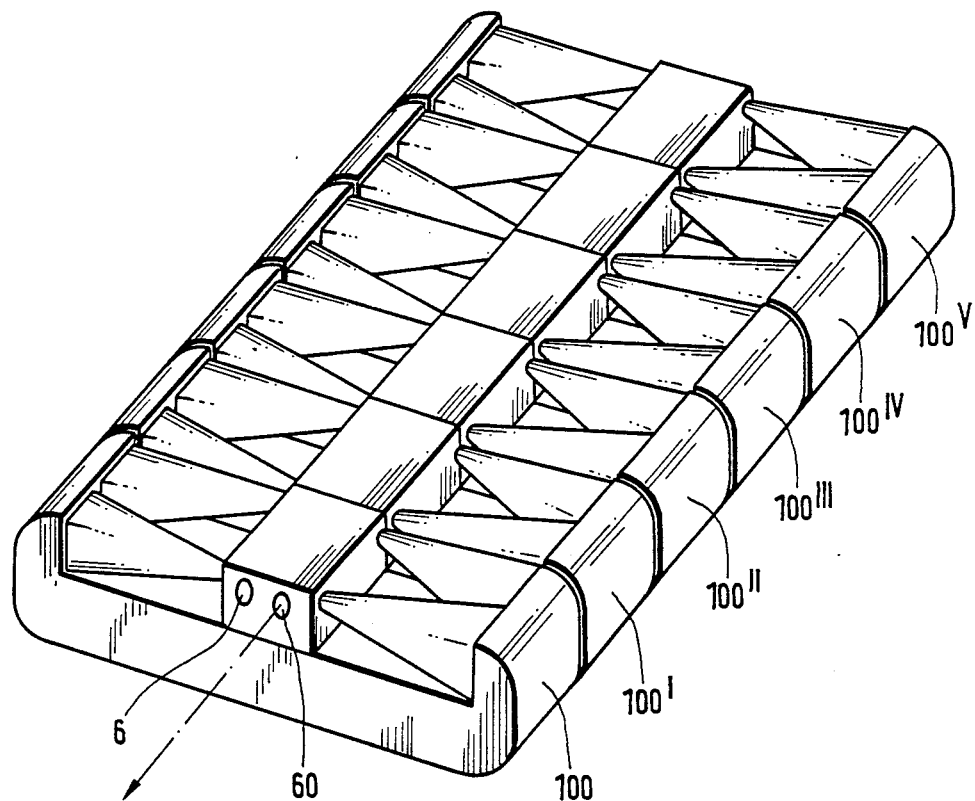
FIG. 5 is a perspective view of several laser devices according to FIG. 4, connected in series.

As seen in FIG. 5 several of the modules shown in FIG. 4 can be combined into a laser of correspondingly high power.

Figure 6:
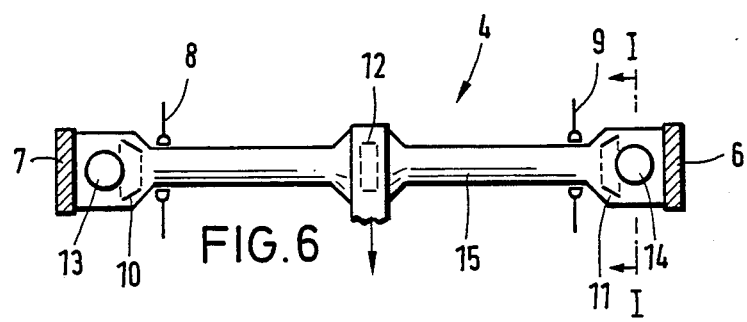
FIG. 6 is a longitudinal section of a laser tube.

FIG. 6 shows a longitudinal section of the laser resonator designated as 4 in FIG. 1 in which reference numerals 6 and 7 designate the laser mirrors, reference numerals 8 and 9 designate two high-frequency electrodes and reference numerals 10, 11 and 12 designate high voltage ring electrodes.

In accordance with the invention a hybrid excitation scheme is used for separating the processes of generation of the free electrons required for excitation and the supply of the excitation energy: High frequency energy (frequency approximately 10 to 30 MHz) is supplied to the laser resonator 4 by means of a generator, not shown, via the HF electrodes 8 and 9 outside of the discharge chamber 15 at the ends of the laser resonator 4, and a plasma is created. The free electrons thus generated are accelerated in a high voltage drift field and are available for excitation. High voltage is supplied to the electrode rings 10 and 11 (pin electrodes may be used), which are disposed in the direction of flow a few centimeters in front of the HF electrodes 8 and 9 within a bulge in the laser tube 4. An additional (counter-) electrode is located in the center of the laser tube at the place where the laser gas is drawn off by means of the radial blower 3 (see FIG. 2).

It has been found advantageous to supply approximately 5 to 25% (and more preferably, 5 to 20%) of the total excitation energy in the form of high frequency energy and to dispose the high voltage power so that no independent discharge occurs when the HF transmitter is turned off. In this manner a very homogenous discharge and a particularly large efficiency are the result.

Figure 7:
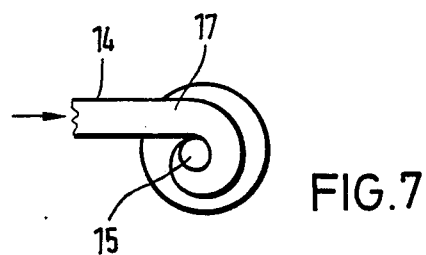
FIG. 7 is a spiral gas supply into the laser tube.

The laser gas can be supplied through the openings 13 and 14 vertically in the center of the tube at the enlarged ends of the laser resonator 4. With a small fraction of HF excitation energy, supply via a spiral guide 17 is advantageous (FIG. 7). Because of the spiral movement of the laser gas the homogeneity of the gas discharge is also improved (see DE 33 23 954 A1). FIG. 7 is a section through the laser tube 4 along the line I—I shown in FIG. 6. Radial blowers are well known all over the world and can be purchased e. g. from the U.S. company Garrett or the German company K, K, & K (Kühnle, Kausch und Kopp in Frankenthal). They are used e. g. for turbo chargers. An appropriate size is that for big trucks or stationary power engines. Pictures are available in the TZN Unterlüss, but not in Eschborn.

The present disclosure relates to the subject matter disclosed in the Federal Republic of Germany, P 36 43 735.2-33 on Dec. 20th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A gas transport laser with longitudinal gas flow, comprising:
    at least one laser tube with a resonator, defining a discharge chamber, said at least one laser tube extending in a first direction and having two opposite inlet ends and a center outlet between said opposite inlet ends;
    a gas cooling system having a cooling system inlet and a cooling system outlet and means for directing gas to be cooled therethrough from the cooling system inlet to the cooling system outlet, in a second direction generally perpendicular to said first direction;
    a gas feed connected to said gas cooling system outlet, having means for directing gas cooled by said gas cooling system in directions essentially opposite said second direction, directly to said two opposite inlet ends of said at least one laser tube;
    a radial blower having a first end connected to said center outlet of said at least one laser tube and a second end connected to said cooling system, having an axis extending in a third direction from said first end to said second end generally perpendicular to said first direction and said second direction and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to said cooling system to be drawn through said cooling system and said gas feed to said two opposite inlet ends of said at least one laser tube, the laser having dimensions measured in said first, second and third directions, the dimension in said first direction being less than the dimension in said second direction; and
    means for exciting the laser gas in said at least one laser tube.

2. A gas transport laser as in claim 1, wherein said at least one laser tube comprises two parallel laser tubes, said means for drawing laser gas, including said radial blower, communicating with said two laser tubes at the respective center outlets of both of said two laser tubes, and comprising means for drawing laser gas in said two laser tubes into said radial blower through the respective center outlets of said two laser tubes and feeding the laser gas symmetrically back to said two laser tube via said cooling system and said gas supply system.

3. A gas transport laser as in claim 1, wherein said gas feed includes spiral guides at said ends of said at least one laser tube for guiding the laser gas into said at least one laser tube at said opposite inlet ends.

4. A gas transport laser, comprising a plurality of single laser systems disposed side-by-side on a same axis, each of said single laser systems including:
    at least one laser tube with a resonator, defining therein a discharge chamber said at least one laser tube extending in a first direction and having two opposite inlet ends and a center outlet between said opposite inlet ends;
    a gas cooling system having a cooling system inlet and a cooling system outlet and means for directing gas to be cooled therethrough from the cooling system inlet to the cooling system outlet, in a second direction generally perpendicular to said first direction;
    a gas feed coupled to said gas cooling system outlet, having means for directing gas cooled by said gas cooling system in directions essentially opposite said second direction, directly to said two opposite inlet ends of said at least one laser tube;
    a radial blower having a first end connected to said center outlet of said at least one laser tube and a second end connected to said cooling system, having an axis extending in a third direction from said first end to said second end generally perpendicular to said first direction and said second direction and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to said cooling system to be drawn through said cooling system and said gas feed to said two opposite inlet ends of said at least one laser tube, the laser having dimensions measured in said first, second and third directions, the dimension in said first direction being less than the dimension in said second direction; and
    means for exciting the laser gas in said at least one laser tube.

5. A gas transport laser as in claim 4, wherein said at least one laser tube comprises two parallel laser tubes, said means for drawing laser gas, including said radial blower, communicating with said two laser tubes at the center outlets of both of said two laser tubes, and comprising means for drawing laser gas in said two laser tubes into said radial blower through the centers of said two laser tubes and feeding the laser gas symmetrically back to said two laser tube, via said cooling system and said gas supply system.

6. A gas transport laser as in claim 4, wherein said at least one laser tube includes a discharge chamber, said means for exciting the laser gas includes external high frequency electrodes outside of said discharge chamber and adjacent to said opposite inlet ends.

7. A gas transport laser as in claim 4, wherein said gas feed includes spiral guides at said opposite inlet ends of said at least one laser tube for guiding the laser gas into said at least one laser tube at said opposite inlet ends.

8. A gas transport laser with longitudinal gas flow, comprising:
- at least one laser tube with a resonator, defining a discharge chamber, said at least one laser tube extending in a first direction and having two opposite inlet ends and a center outlet between said opposite inlet ends;
- a gas cooling system having a cooling system inlet and and a cooling system outlet and means for directing gas to be cooled therethrough from the cooling system inlet to the cooling system outlet, in second directions generally perpendicular to said first direction;
- a gas feed connected to said gas cooling system outlet, having means for directing gas cooled by said gas cooling system in directions essentially opposite said second directions, directly to said two opposite inlet ends of said at least one laser tube;
- a radial blower having a first end connected to said center outlet of said at least one laser tube and a second end connected to said cooling system, having an axis extending in a third direction from said first end to said second end generally perpendicular to said first direction and said second directions and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to the cooling system to be drawn through said cooling system and said gas feed to said two opposite inlet ends of said at least one laser tube, the laser having dimensions measured in said first, second and third directions, the dimension in said first direction being less than the dimension in said second direction; and
- means for simultaneously subjecting the laser gas in said at least one laser tube to a high frequency discharge and a high voltage discharge, the high frequency discharge extending only over a part of the at least one laser tube at said opposite inlet ends.

9. A gas transport laser as in claim 8, wherein said means for exciting the laser gas comprises means for generating a total excitation power of 5 to 25 percent of power.

10. A gas transport laser as in claim 8, wherein said means for exciting the laser gas comprises means for generating voltages for the high voltage discharge such that no independent discharge takes place in the absence of excitation by the high frequency radiation.

11. A gas transport laser as in claim 8, wherein said at least one laser tube includes a discharge chamber, said means for exciting the laser gas includes external high frequency electrodes outside of said discharge chamber and adjacent to said opposite inlet ends.

12. A laser as in claim 11, wherein said means for exciting the laser gas further comprises high voltage electrodes in said chamber adjacent said opposite inlet ends said center outlet.

13. A gas transport laser, comprising a plurality of single laser systems disposed side-by-side on a same axis, each of said single laser systems including:
- at least one laser tube with a resonator, defining therein a discharge chamber said at least one laser tube extending in a first direction and having two opposite inlet ends and a center outlet between said opposite inlet ends;
- a gas cooling system having a cooling system inlet and and a cooling system outlet and means for directing gas to be cooled therethrough from the cooling system inlet to the cooling system outlet, in a second direction generally perpendicular to said first direction;
- a gas feed coupled to said gas cooling system outlet, having means for directing gas cooled by said gas cooling system in directions essentially opposite said second direction, directly to said two opposite inlet ends of said at least one laser tube;
- a radial blower having a first end connected to said center outlet of said at least one laser tube and a second end connected to said cooling system, having an axis extending in a third direction from said first end to said second end generally perpendicular to said first direction and said second directions and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to the cooling system to be drawn through said cooling system and said gas feed to said two opposite inlet ends of said at least one laser tube, the laser having dimensions measured in said first, second and third directions, the dimension in said first direction being less than the dimension in said second direction; and
- means for simultaneously subjecting the laser gas in said at least one laser tube to a high frequency discharge and a high voltage discharge, the high frequency discharge extending only over a part of the at least one laser tube at said opposite inlet ends.

14. A gas transport laser, comprising a plurality of single laser systems disposed side-by-side on a same axis, each of said single laser systems including:
- at least one laser tube with a resonator, defining therein a discharge chamber said at least one laser tube extending in a first direction and having two opposite inlet ends and a center outlet between said opposite inlet ends;
- a gas cooling system having a cooling system inlet and and a cooling system outlet and means for directing gas to be cooled therethrough from the cooling system inlet to the cooling system outlet, in a second direction generally perpendicular to said first direction;
- a gas feed coupled to said gas cooling system outlet, having means for directing gas cooled by said gas cooling system in directions essentially opposite said second direction, directly to said two opposite inlet ends of said at least one laser tube;
- a radial blower having a first end connected to said center outlet of said at least one laser tube and a second end connected to said cooling system, having an axis extending in a third direction from said first end to said second end generally perpendicular to said first direction and said second directions and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to the cooling system to be drawn through said cooling system and said gas feed to said two opposite inlet ends of said at least one laser tube, the laser having dimensions measured in said first, second and third directions, the dimension in said first direction being less than the dimension in said second direction; and means for exciting the laser gas in said at least one laser tube, including means for generating a total excitation power 5 to 25 percnet of which is high frequency ratiation power.

15. A gas transport laser, comprising a plurality of single laser systems disposed side-by-side on a same axis, each of said single laser systems including:

at least one laser tube with a resonator, defining therein a discharge chamber said at least on laser tube extending in a first direction and having two opposite inlet ends and a center outlet between said opposite inlet ends;

a gas cooling system having a cooling system inlet and and a cooling system outlet and means for directing gas to be cooled therethrough from the cooling system inlet to the cooling system outlet, in a second direction generally perpendicular to said first direction;

a gas feed coupled to said gas cooling system outlet, having means for directing gas cooled by said gas cooling system in directions essentially opposite said second direction, directly to said two opposite inlet ends of said at least one laser tube;

a radial blower having a first end connected to said center outlet of said at least one laser tube and a second end connected to said cooling system, having an axis extending in a third direction from said first end to said second end generally perpendicular to said first direction and said second directions and connected at said first end to said center outlet of said at least one laser tube, said radial blower including means for drawing laser gas in said at least one laser tube in said first direction from said opposite inlet ends into said radial blower through said center outlet, and through said radial blower along and radially with respect to said axis to said second end, so that the laser gas is fed to the cooling system to be drawn through said cooling system and said gas feed to said two opposite inlet ends of said at least one laser tube, the laser having dimensions measured in said first, second and third directions, the dimension in said first direction being less than the dimension in said second direction; and means for exciting the laser gas in said at least one laser tube, including means for generating voltages for high voltage discharge in the laser gas such that no independent discharge takes place in the absence of excitation by the high frequency radiation.

16. A laser as in claim 15, wherein said means for exciting the laser gas further comprises high voltage electrodes in said chamber adjacent said opposite inlet ends and said center outlet.

* * * * *